United States Patent [19]

Garuglieri

[11] Patent Number: 5,437,319

[45] Date of Patent: Aug. 1, 1995

[54] PIVOTING POWER TOOL WITH TABLE

[75] Inventor: Andrea Garuglieri, Colle Brianza, Italy

[73] Assignee: Black & Decker Inc., Newark, Del.

[21] Appl. No.: 111,700

[22] Filed: Aug. 25, 1993

[30] Foreign Application Priority Data

Aug. 28, 1992 [GB] United Kingdom ............. 9218363

[51] Int. Cl.⁶ ............................................. B25H 1/00
[52] U.S. Cl. ..................... 144/286 R; 83/471.3;
83/477.2; 83/574; 144/1 C; 248/637; 248/676
[58] Field of Search ............ 144/1 R, 1 C, 286 R;
83/471.3, 474, 484, 477.2, 574, 786; 248/637,
646, 671, 676

[56] References Cited

U.S. PATENT DOCUMENTS

| | | | |
|---|---|---|---|
| 2,577,206 | 12/1951 | Patterson | 144/1 C |
| 2,744,550 | 5/1956 | Knapp | 144/1 C |
| 3,011,533 | 12/1961 | Newman, Sr. | 144/1 C |
| 3,069,154 | 12/1962 | Zwick | |
| 3,229,732 | 1/1966 | Mayo | 144/1 R |
| 3,570,564 | 3/1971 | Bergler | |
| 4,465,114 | 8/1984 | Schumacher | 144/286 R |
| 4,665,962 | 5/1987 | Ordonez | 144/286 A |

FOREIGN PATENT DOCUMENTS 1117359 5/1962 Germany.
1628992 11/1971 Germany.
3606524 4/1987 Germany.
4019222 12/1991 Germany.

Primary Examiner—W. Donald Bray
Attorney, Agent, or Firm—Charles E. Yocum; Dennis A. Dearing; Frederick Voss

[57] ABSTRACT

A power tool (10) has a working assembly (20) mounted on a first side of a table (16). The table is pivotable about an axis (41) with respect to a frame (14) between two working dispositions. A working head (e.g. blade 32) of the assembly (20) is positionable through an aperture in the table so that it can work on workpieces supported above either side of the table. The table is connected to the frame through an intermediate member (46) which is pivoted to the frame. The table has a first wheel (40) fixed thereto and a belt passes around the first wheel and around a second wheel (50) fixed to the frame (14) around the pivot (51) of the intermediate member. Pivoting of the intermediate member relative to the frame rolls the first wheel inside the belt and rotates the table between bench mode and snip-off mode.

20 Claims, 5 Drawing Sheets

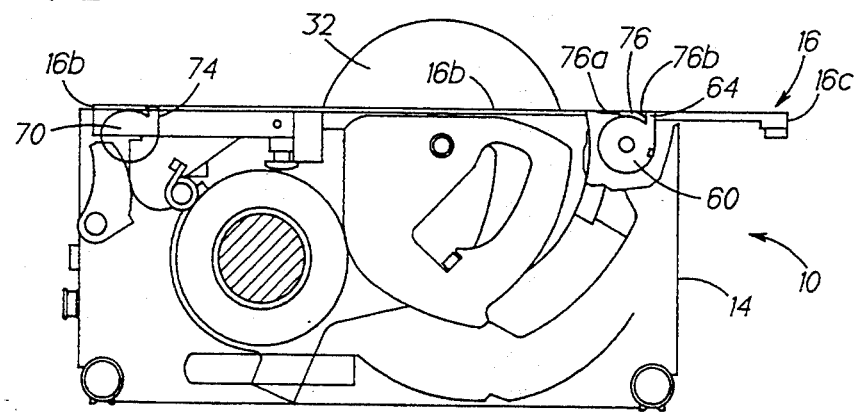
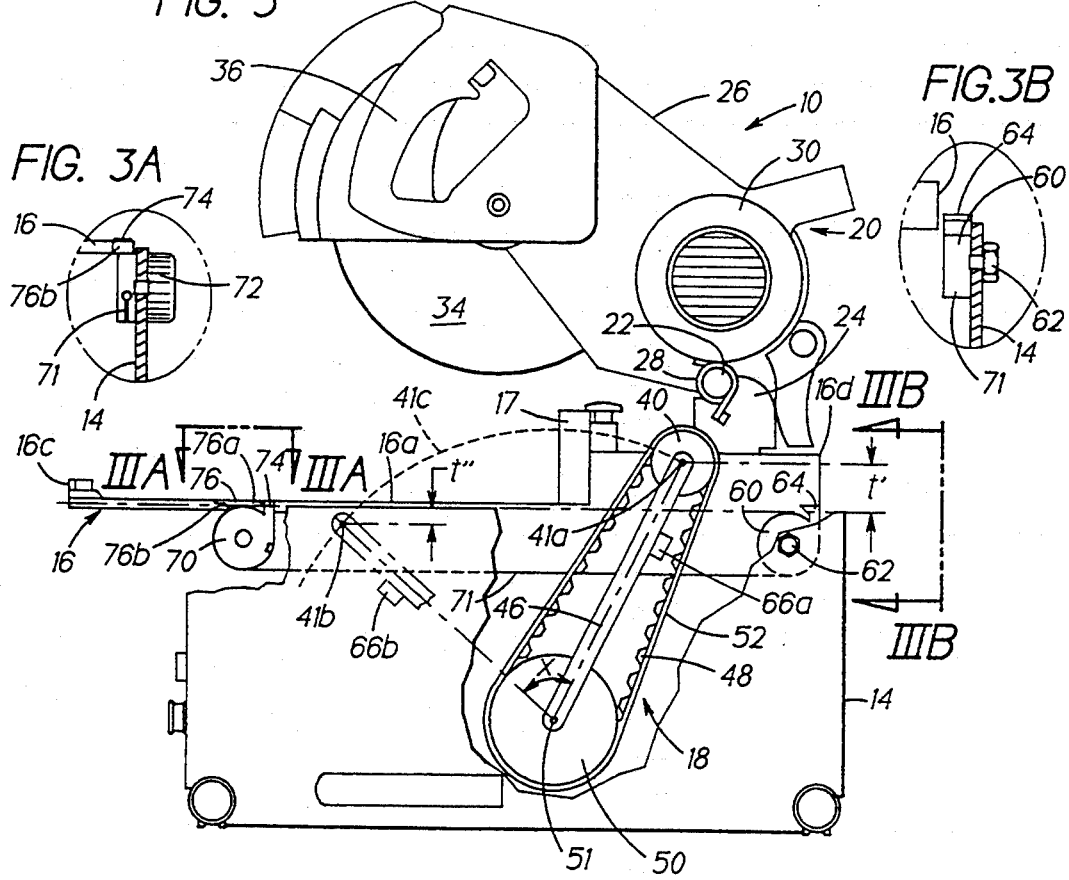

PIVOTING POWER TOOL WITH TABLE

BACKGROUND OF THE INVENTION

This invention relates to power tools, and particularly to saws, of the type mounted on a first side of a table adapted to move between two dispositions so that in a first disposition the tool is above the first side of the table and can be manipulated to work on workpieces supported on said first side, and in a second disposition, the tool is below the first side of the table, a working part thereof projecting through an aperture in the table to work on workpieces supported on a second side of the table.

Such an arrangement is particularly effective for circular saws and was first described in DE-A-1628992. Here a saw is mounted on a table which is pivoted in a frame and flips over between two modes of operation, a first snip-off mode and a second bench saw mode.

One of the benefits of such an arrangement is its versatility. Not only does it flip between two, quite different, modes of operation, but also it is mounted on a frame and arranged so that it is transportable. Ideally, it should be capable of being carried through a standard interior doorway and being carried in the trunk of a common car. Thus it can be carried to the site where it is needed. If it is light enough to be carried by one man, then so much the better.

However, new regulations are being introduced in some jurisdictions which to some extent threaten tiffs versatility. The table of a table saw must now extend behind and in front of the blade by an amount not much less than the diameter of the blade. To accommodate this length of table, the frame must be correspondingly large, making it more bulky and awkward to transport and possibly beyond its capacity to fulfil the desirable aims mentioned above.

Another problem with flip-over saws of this type is that, in snip-off mode, the saw is mounted at the back of the table to give plenty of room under mid in front of the blade for workpiece manipulation. However, the pivot axis of the table needs to be in the middle of the frame, and near the middle of the table. While this has been feasible in the past, (with small tables) nevertheless it is not satisfactory because the center of gravity of the table and saw is always to one side of the pivot in the two working dispositions.

This problem may be further exacerbated by the new regulations mentioned above. If the table is pivoted in its middle, then the centre of gravity may move further away from the pivot by lengthening the table. Alternatively, the pivot can be moved nearer the back of the table (while remaining in the centre of the frame) but in this event, the table is no longer central on the frame. At least in one disposition, therefore, the long part of the table will be over the short part of the frame, and there will be a consequent overhang, which may be unbalanced or, at best, ergonomically unattractive.

Another problem with existing arrangements is that it is mechanically simplest if the pivot is above the table. This is because a bearing must be fixed to the table and this is most easily achieved with a bracket attached to one side of the table. What this results in, however, is one side being below the pivot when that side is uppermost, but the other side being above the pivot when it is uppermost. While this presents no problems during normal operations, it means that accessories, such as side tables, can only be used in one mode of saw operation, because in the other mode they are at the wrong level.

Moreover, it has to be born in mind that several design criteria are inherent with this arrangement of tool. The first is that the table should be as thin as possible, so that the blade projects through it to the maximum possible extent in the bench saw mode. This therefore ensures that, in any practical arrangement, the pivot for the table will extend to one side or the other of the table. This cannot be permitted on the bench mode side because the pivot might interfere with movement on the table of larger workpieces such as sheet material. For the stone reason it cannot be allowed on the snip-off-mode side of the table, at least not in front of the fence which is inevitably provided behind the blade. If the pivot is in front of the fence, then anything other than the shortest workpieces will be interfered by the pivot. The blade, of course, is mostly in front of the fence. With the new regulation requiring a relatively long table, the minimum permissible length of table has the blade in the middle of the table. Beating all this in mind, it is therefore apparent that the pivot cannot be in the middle of the table (assuming the minimum permissible table size is desirable). Consequently, there will inevitably be some overhang of the long leaf of the table over at least one edge of the frame, unless the length of the frame on either side of the pivot is long enough to accommodate the longer leaf of the table, on whichever side of the frame it lies. Either mode is ungainly and makes manipulation of the saw more difficult.

SUMMARY OF THE INVENTION

Thus it is an object of the present invention to overcome these problems or at least to mitigate their effects.

In accordance with this invention there is provided a power tool comprising a frame, a table mounted on the frame, a working assembly mounted on one side of the table and a pivot system, said pivot system enabling the table to pivot between two dispositions thereof with respect to the frame about an axis which is movable in the frame in a transverse direction with respect to said axis between two positions.

By rendering the pivoting axis movable, it can be positioned on the table in the said two dispositions where it is least obtrusive.

Preferably said axis is movable between said two positions in an arc mostly above the table. This enables a small frame to be employed, despite the use of a long table.

Said axis is preferably movable in response to pivoting of the table about said axis, preferably simultaneously with pivoting of the table through 180° relative to the frame. In this event, if the axis moves up from either position in said are the table is lifted from either of its dispositions.

Preferably said axis moves from a position above the level of the table to a position below the level of the table. This enables the table to be positioned at the stone level in either disposition. Thus accessories useful in one mode can also be Used in the other mode without having to arrange for any change of their level between said modes.

The present invention further provides specific apparatus in which said pivot system comprises an intermediate member which is pivoted to both the table and the frame.

The table may have a first wheel fixed thereto around said axis and rotation means in the frame arranged to rotate the wheel when it moves between said positions.

Said rotation means may comprise belt means around said first wheel and around a second wheel fixed around the pivot of said intermediate member to said frame, so that pivoting of said intermediate member relative to the frame rolls the first wheel inside said belt means and rotates the table.

Preferably, the first and second wheels are dimensioned so that, given the extent of the pivot of said intermediate member relative to the frame between said two positions of said axis, the first wheel and table rotate through 180°.

Said first wheel may be mounted on one of said sides of the table, in which case said wheels and intermediate member are arranged so that said sides of the table are at the same level in the frame in the two dispositions of the table.

The power tool preferably includes catch memos to lock the table in either disposition. Preferably the frame has a catch member at both ends of the frame adapted to catch and support a front edge of the table in either of its dispositions.

Needless to say, it is extremely preferable to have two of said pivot systems, one on either side of the table and frame.

While the above-defined is the preferred arrangement, nevertheless, other apparatus is feasible to put the essential characteristic of this invention into effect and so the present invention is not limited by the specific apparatus claimed. In its crudest form, for example, pivot members on the table could be slidable between said positions in slots in the frame. A set-up might be wheels on the table pivots that roll along a track in the frame. The pivots could be connected to the frame by intermediate members, as described above. Indeed, in place of the belt defined above the second wheel could be a gear mounted on the intermediate member meshing with said first wheel and meshing with an arcuate rack in the frame.

BRIEF DESCRIPTION OF THE DRAWINGS

The invention is further described hereinafter, by way of example only, with reference to the accompanying drawings, in which:

FIG. 2 is a side view (transparent) of the saw of FIG. 1 in a bench mode of operation;

FIG. 3 is a side view, partly cut away, of the saw of FIGS. 1 and 2 in the snip-off position;

DETAILED DESCRIPTION OF THE PREFERRED EMBODIMENTS

Figure 1:
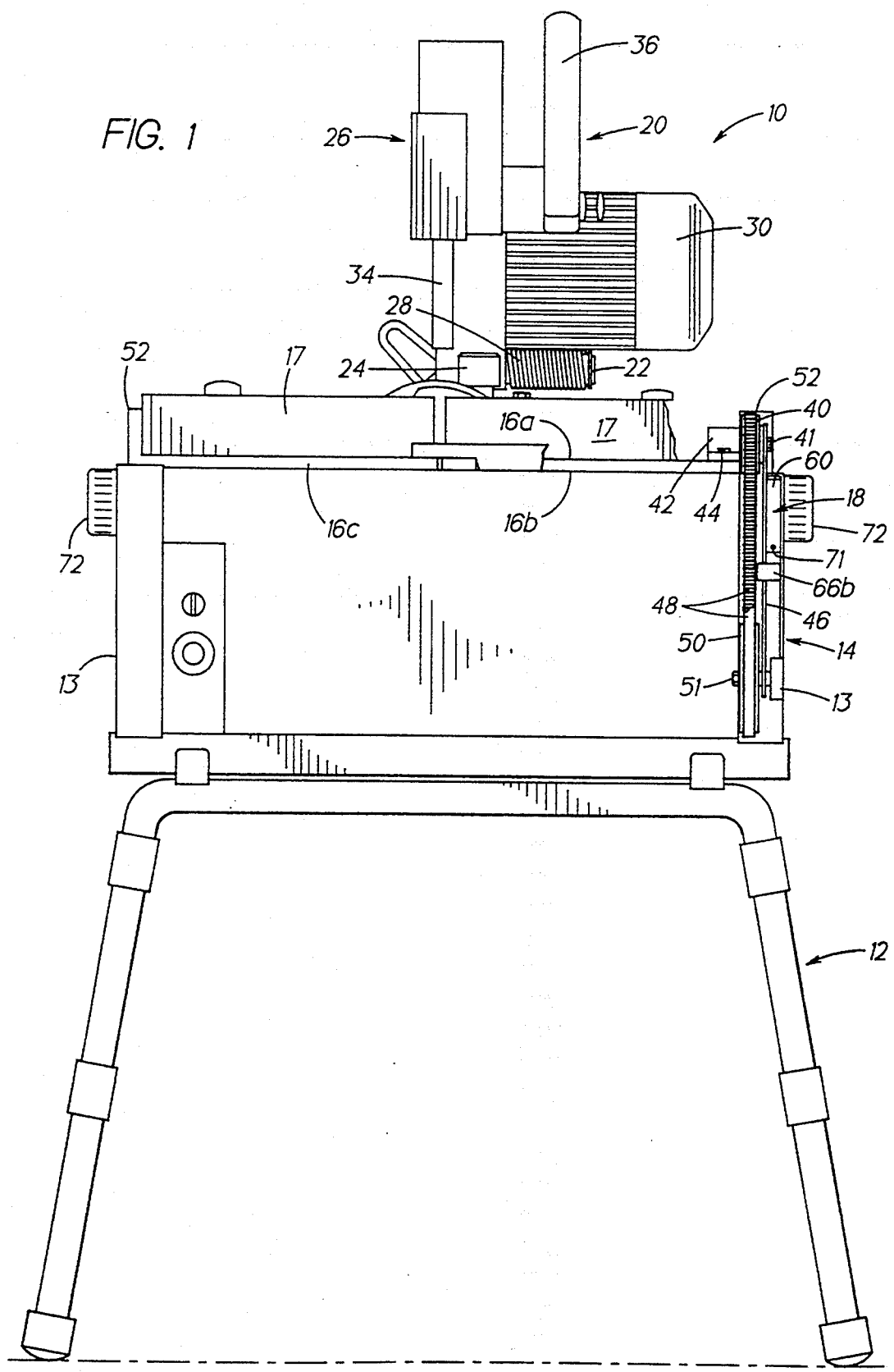
FIG. 1 is a front view of a saw according to the present invention.
Figure 4A:
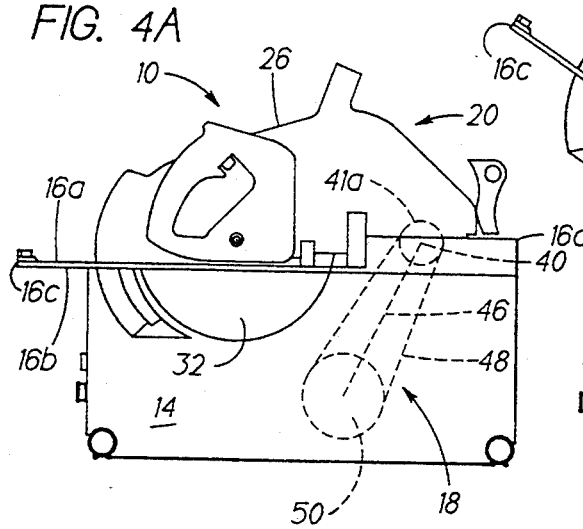
FIGS. 4A-E are a sequence of side views (transparent) showing flip-over from snip-off to bench saw modes.
Figure 4B:
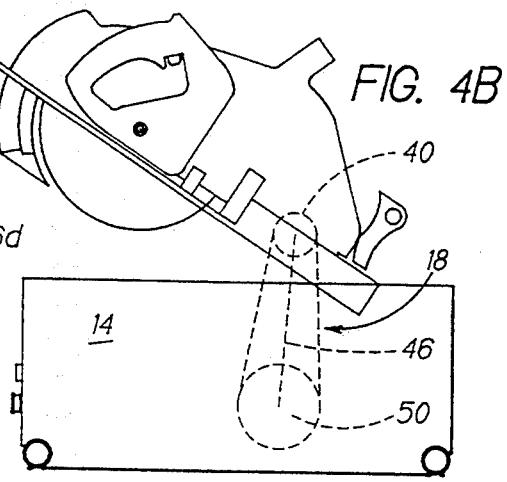
Figure 4C:
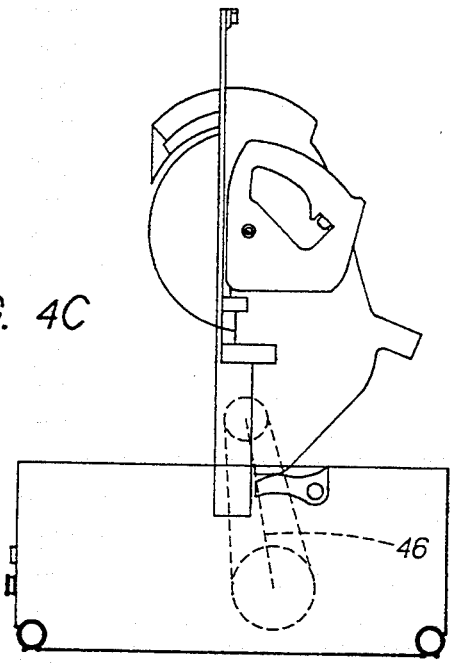
Figure 4D:
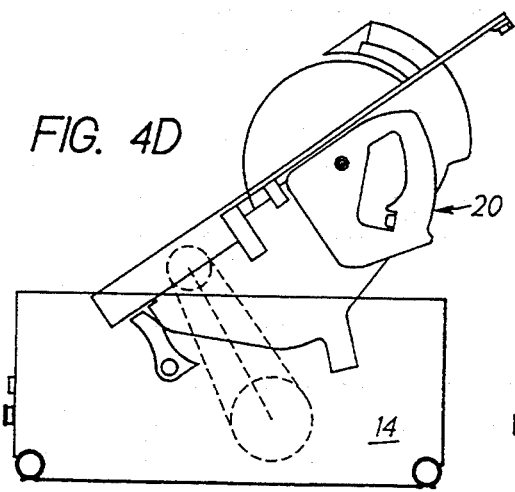
Figure 4E:
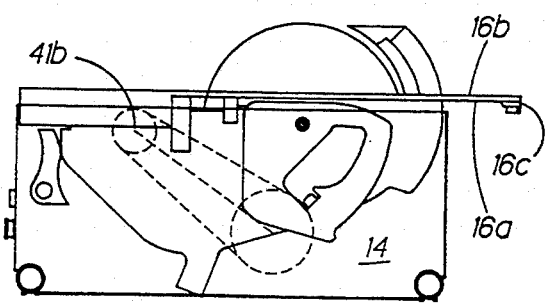

In FIG. 1, a power tool 10 is a saw and has legs 12 supporting a frame 14. A table 16 is pivoted with respect to the frame through a pivot system 18 described further below. On the table 16, on a first side 16a thereof, is mounted a saw assembly 20.

The saw assembly 20 comprises a pivot 22 (see also FIG. 3) between a pivot member 24 and a saw housing 26. A spring 28 biases the saw housing 26 to an open position as shown in FIG. 3.

The saw housing 26 includes a motor 30 drivingly connected to a saw blade 32 (see FIG. 2) under a lower guard 34. A handle 36 is operable to pivot the housing 26 up and down about pivot 22 to plunge the blade 32 into workpieces supported on the side 16a of the table 16. A fence 17 is used to position workpieces. The table 16 has a slot (not visible) into which the blade can be lowered.

When pivoted right down against the table 16, the housing 26 can be locked in position by memos not shown. When locked in this position, as shown in drawing A of FIG. 4, the table 16 is ready for pivoting to the bench saw mode shown in FIG. 2. Here, the second side 16b is uppermost and the blade 32 protrudes right through the table 16. This mode is particularly useful for rip cutting of long workpieces moved relative to the blade over, but supported on the table 16.

The pivoting system 18 allowing flip over between the two modes of operation shown in FIGS. 2 and 3 comprises a first toothed wheel 40 which is fixed to the side 16a of the table through a bracket 42 secured to the table by bolts 44 (see FIG. 1). Two such wheels 40 and brackets 42 are provided, at either edge of the table on the side 16a, but only one is shown in the drawings.

A second wheel 50 is fixed in each side 13 of the frame 14. An intermediate member 46 is pivoted about the center of each wheel 40,50 and serves to tension a belt 48 around the two wheels. A cover 52 extends over the wheels 40,50.

As the member 46 pivots around the axis 51 of the wheel 50, the wheel 40 is forced to roll inside the belt 48. Since the table 16 is rigidly connected to the wheel 40, the table pivots about pivot axis 41, being the axis of the wheel 40 in the member 46. Moreover the axis moves transversely with respect to itself between two positions indicated at 41a and 41b in the drawings.

The dimensions and positions of the wheels 40 and 50, and the length of the member 46, are so arranged that, on pivoting through an angle x (which is sufficient to take the pivot axis 41 as far below (t''), the center line between sides 16a and 16b of the table as it presently is above (t') that line in FIG. 3, i.e.. t'=t'' while at the same time completing half a revolution of the wheel 40 and thus mining the table 16 upside down.

This sequence of moves is shown in FIG. 4. In drawing A, the table has side 16a uppermost and the saw assembly 20 is in the snip-off mode, although the saw housing 26 is locked in its lowered position with the blade 32 protruding through the table. Here axis 41 is in its first position 41a. In drawing B, the front 16c of table 16 has been pulled forwardly and lifted. By virtue of the pivot system 18, the table cannot lift without coming forward and cannot come forward without lifting. In other words, the table is constrained to follow just the single path or sequence of moves illustrated. In drawing C, the table is vertical having been rotated through 90°. The intermediate member 46 has already passed its peak in this position so that no further lifting of the table and assembly is necessary.

In drawing D, the saw assembly 20 is beginning to enter the frame 14 and in drawing E it is inside the frame with the table 16 completely inverted (i.e. with side 16b now uppermost). Here axis 41 has moved completely to its second position 41b. Moreover, the second side 16b of the table is at the same level with respect to the frame 14 as the first side 16a was in the snip-off mode of drawing A. Thus accessories connectable to the frame 14 can be arranged to be useful to both modes of operation of the saw without having to arrange for any change of height of the table.

Mowerover, the axis 41 moves in an arc 41c between its two positions 41a, 41b and from either position the axis 41 first moves upwardly so that the table is always raised against gravity from either disposition. This ensures that release of the locks referred to further below does not precipitate movement of the table in an uncontrolled manner.

Referring back to FIG. 3, the rear end 16d of the table 16 is unsupported. A rear knob 60 having a hook 64 is rotatably mounted in the side of the frame 14 on a bolt 62, but it has no function in this position of the saw. However, a stop block 66a is fixed in the side 13 of the frame 14. The intermediate member 46 abuts the block 66a and through the connection of the member 46 to the back of the table 16, supports the table at its rear edge 16d.

Knob 60 is connected to a front knob 70 by a cable 71. Instead of a bolt 62, knob 70 has a handle 72 by means of which it may be turned. Otherwise it is structurally the same as knob 60 and is rotably mounted in the side of the frame 14. It has a hook 74 which catches a catch ledge 76 on the table 16 mad which has catch surfaces 76a and b. In the snip-off mode, it is catch 76a which is captured by the hook 74. Rotation of the handle 72 releases hook 74 from the catch. Moreover, the front of the table is supported by the ledge 76 resting on the knob 70. Only one catch is necessary to hold the table 16 down, because the rear edge 16d, for example, cannot rise without the front edge 16c rising. In other words, since the front edge 16c is locked by hook 74, then the whole table is locked as well. In any event, the table is heavy at its rear edge with its burden of the saw assembly 20, and so it is unlikely to lift anyway.

On release of the hooks 74, (there being one on each side of the frame) the table can pivot as described above with reference to FIG. 4. However, when the table again comes to rest in its inverted disposition on the knobs 60,70, it is hook 64 of the knob 60 which engages catch surface 76b of catch 76. Moreover, it rests on knob 60 and so supports the front (now rear) edge 16c of the table. Again, the rear edge 16d (now at the front) is unsupported except that a second stop block 66b is formed in the side 13 of the frame 14 and against which the member 46 abuts in the bench mode position. Again, no catch is required here because end 16d of the table cannot lift in the bench mode position without edge 16c lifting simultaneously, and again to a much greater extent. Moreover, the weight of the saw housing holds that end down. Preferably both knobs 60,70 are spring biased in an anti-clockwise direction (looking at FIG. 3) although only knob 60 absolutely requires it given the cable 71 arrangement shown.

One of the major benefits of this arrangement is that the table 16 is constrained to a single freedom of movement, despite the somewhat complicated nature of that movement. But, as a consequence of this constraint, there is little risk of the arrangement jamming as it might if, for example, the crudest form of the present invention as defined above was employed. In that case it would be essential for the operator to ensure that the table remained square to the frame, or that he pivoted the table at the right moment in relation to the transverse movement of the pivot axis. However, with the present arrangement no such care is required. Pulling the table forward has the effect of commencing pivoting of the table, and vice versa. Thus while cinder forms of the present invention are feasible, the arrangement described with reference to the drawings is preferred.

Figure 5:
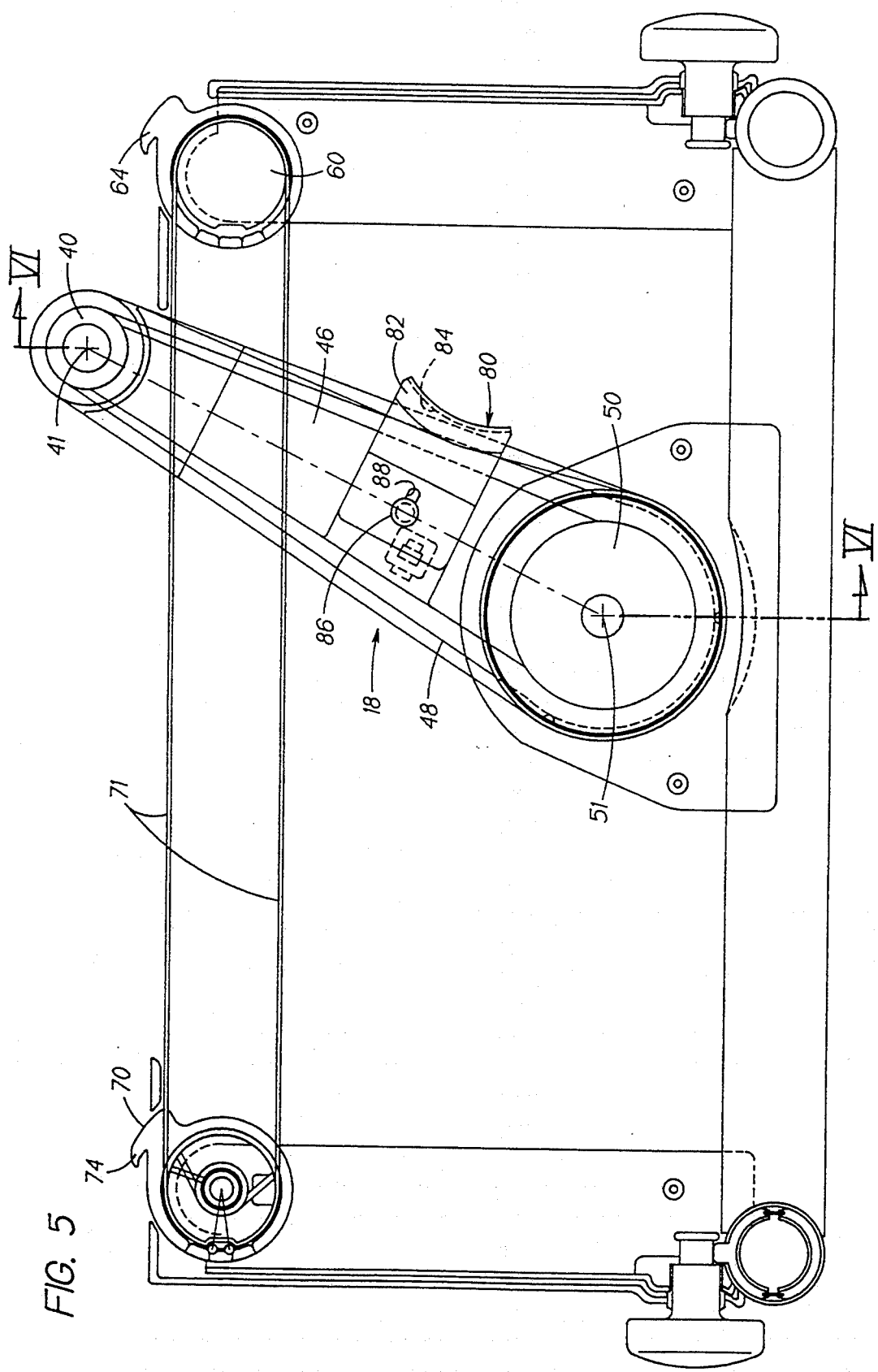
FIG. 5 is a side view of the frame of a preferred embodiment of the present invention; and, FIG. 6 is a front view, partly in section along the line VI—VI in FIG. 5 of the embodiment shown in FIG. 5.
Figure 6:
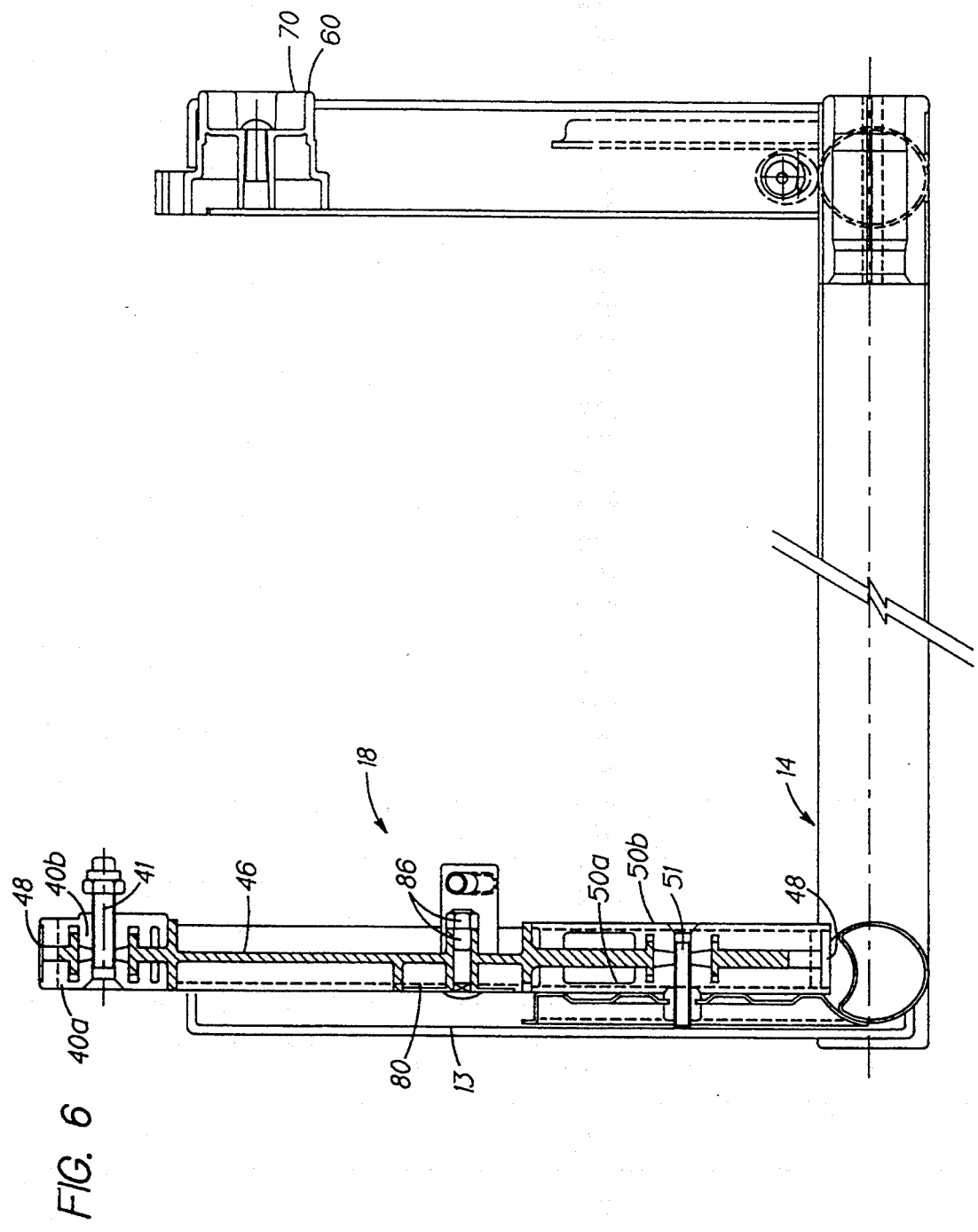

Finally, although FIGS. 1 and 3 show the intermediate member 46 to one side of the wheels 40,50 an alternative arrangement is shown in FIGS. 5 and 6. Here, the wheels 40,50 are each constructed from two half-shells 40a,b and 50a,b, with the member 46 disposed between the half-shells. This has the effect of reducing bending loads on the member 46, because it is supported by the wheels, at least at its most vulnerable areas near its pivots 41,51 to the wheels 40,50 respectively.

FIG. 5 also shows an adjustment mechanism 80 to tension the belt 48 which comprises a tensioner 82 having a curved surface 84 pressing the belt 48 and being connected to the member 46 by bolt and nut 86. The bolt passes through an eye 88 of the tensioner enabling its adjustment.

What is claimed is:

1. A power tool comprising a frame, a table mounted on the frame, a working assembly mounted on one side of the table, and a pivot system operatively associated with said working assembly, said pivot enabling the table to pivot between two dispositions thereof with respect to the frame about an axis which is moveable in the frame, said axis being moveable between two positions in a transverse direction with respect to said axis.

2. A power tool according to claim 1, wherein said axis is movable between said two positions in an arc.

3. A power tool according to claim 1, wherein said axis is movable in response to pivoting of the table about said axis.

4. A power tool according to claim 3, wherein said axis is movable between said positions simultaneously with pivoting of the table between said dispositions about said axis through 180° relative to the frame.

5. A power tool according to claim 1, wherein said axis is adapted to move from a position above the level of the table to a position below the level of the table.

6. A power tool according to claim 2, wherein said axis is adapted to move from a position above the level of the table to a position below the level of the table.

7. A power tool according to claim 4, wherein said axis is adapted to move from a position above the level of the table to a position below the level of the table.

8. A power tool according to claim 1, wherein that said pivot system comprises an intermediate member which is pivoted to the table about said axis and to the frame.

9. A power tool according to claim 8, wherein the table has a first wheel fixed thereto around said axis and rotation means in the frame arranged to rotate the wheel when it moves between said positions.

10. A power tool according to claim 9, wherein said rotation means comprises a belt around said first wheel and around a second wheel fixed around the pivot of said intermediate member to said frame.

11. A power tool according to claim 10, wherein the first and second wheels are dimensioned so that, given the extent of the pivot of said intermediate member relative to the frame between said two positions of said axis, the first wheel and table rotate through 180°.

12. A power tool according to claim 11, wherein said first wheel is mounted on said one side of the table, said wheels and intermediate member being arranged so that said sides of the table are at the same level in the frame in the two dispositions of the table.

13. A power tool according to claim 1, further including catch means to lock the table in either disposition.

14. A power tool according to claim 13, wherein the frame has a catch member at both ends of the frame adapted to catch and support a front edge of the table in either of the dispositions of the table.

15. A power tool according to claim 1, further comprising limit means to limit movement of said axis to between said two positions.

16. A power tool according to claim 8, further comprising limit memos to limit movement of said axis to between said two positions wherein said limit means comprises stops in the frame against which said member abuts in said two positions.

17. A power tool according to claim 1, wherein a working head of the working assembly is positionable through an aperture in the table so that it can work on workpieces supported on either side of the table.

18. A power tool according to claim 17, wherein said working assembly is a circular saw pivoted to said one side of the table.

19. A power tool according to claim 9, wherein said first wheel comprises two half-shells surrounding said intermediate member.

20. A power tool according to claim 10, wherein said second wheel comprises two half-shells surrounding said intermediate member.

* * * * *